United States Patent
Lin et al.

(10) Patent No.: US 8,572,508 B2
(45) Date of Patent: Oct. 29, 2013

(54) APPLICATION DISPLAYING METHOD FOR TOUCH-CONTROLLED DEVICE AND TOUCH-CONTROLLED DEVICE THEREOF

(75) Inventors: Shao-Chieh Lin, New Taipei (TW); Chih-Hsiang Lin, New Taipei (TW); Ching-Sheng Tsai, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 155 days.

(21) Appl. No.: 13/161,455

(22) Filed: Jun. 15, 2011

(65) Prior Publication Data

US 2012/0131503 A1 May 24, 2012

Related U.S. Application Data

(60) Provisional application No. 61/415,872, filed on Nov. 22, 2010.

(30) Foreign Application Priority Data

Apr. 15, 2011 (TW) .............................. 100113137 A

(51) Int. Cl.
*G06F 3/048* (2013.01)
(52) U.S. Cl.
USPC ............................. 715/810; 715/863; 345/173
(58) Field of Classification Search
USPC .................................. 715/810, 863; 345/173
See application file for complete search history.

(56) References Cited

U.S. PATENT DOCUMENTS

| | | | |
|---|---|---|---|
| 2001/0028368 A1* | 10/2001 | Swartz et al. ................. | 345/835 |
| 2003/0041142 A1* | 2/2003 | Zhang et al. ................. | 709/224 |
| 2005/0007616 A1* | 1/2005 | Sugiyama et al. ........... | 358/1.13 |
| 2009/0158189 A1* | 6/2009 | Itani ............................. | 715/772 |
| 2010/0123665 A1* | 5/2010 | Birkler ......................... | 345/173 |
| 2010/0245260 A1* | 9/2010 | Louch .......................... | 345/173 |
| 2011/0078560 A1* | 3/2011 | Weeldreyer et al. ......... | 715/255 |
| 2011/0119624 A1* | 5/2011 | Coldefy et al. .............. | 715/810 |
| 2011/0138313 A1* | 6/2011 | Decker et al. ................ | 715/777 |
| 2011/0143769 A1* | 6/2011 | Jones et al. ............... | 455/456.1 |
| 2012/0096397 A1* | 4/2012 | Ording et al. ................ | 715/802 |

FOREIGN PATENT DOCUMENTS

CN            101498973 A        8/2009

\* cited by examiner

*Primary Examiner* — Doon Chow
*Assistant Examiner* — Shourjo Dasgupta
(74) *Attorney, Agent, or Firm* — Winston Hsu; Scott Margo

(57) ABSTRACT

A method for displaying applications of a touch-controlled device includes the steps of: generating an electronic signal according a gesture applied on a touch panel of the touch-controlled device; generating a detection result according to the electronic signal, wherein the detection result includes a first position of the gesture corresponding to the touch panel; when the detection result indicates that the detected gesture is a multi-fingered grab gesture, starting an application container; and outputting a control signal to the touch panel according to the application container, in order to display the application container at the first position.

13 Claims, 7 Drawing Sheets

(2a)

(2b)

APPLICATION DISPLAYING METHOD FOR TOUCH-CONTROLLED DEVICE AND TOUCH-CONTROLLED DEVICE THEREOF

CROSS REFERENCE TO RELATED APPLICATIONS

This application claims the priority of U.S. Provisional Application No. 61/415,872 filed Nov. 22, 2010, which is included herein by reference.

BACKGROUND OF THE INVENTION

1. Field of the Invention

The present invention relates to a touch-controlled device, and more particularly, to a touch-controlled device and a related method for detecting a gesture applied on a touch panel of the touch-controlled device to display an application container.

2. Description of the Prior Art

With developments of the science and technology, touch-controlled devices become more and more popular nowadays, and the design of the user interface (UI) of the touch-controlled devices plays an increasingly important role as well. However, manipulation gestures of the touch-controlled devices at present are mostly a single-fingered gesture or a two-fingered gesture, and thus the manipulation variations of the gestures are limited.

Hence, how to increase manipulation variability of the touch-controlled device in order to improve the usage efficiency has become an important topic in this field.

SUMMARY OF THE INVENTION

In order to solve the abovementioned problems, it is one of the objectives of the present invention to provide a touch-controlled device and a related method for detecting a gesture to display an application container.

According to an aspect of the present invention, a method for displaying applications of a touch-controlled device is provided. The method includes the following steps: generating an electronic signal according a gesture applied on a touch panel of the touch-controlled device; generating a detection result according to the electronic signal, wherein the detection result includes a first position corresponding to the touch panel; when the detection result indicates that the detected gesture is a grab gesture, starting an application container; and outputting a control signal to the touch panel according to the application container, in order to display the application container at the first position.

According to another aspect of the present invention, a touch-controlled device is provided. The touch-controlled device may include a touch panel, a detecting unit, a determining unit, and a control unit. The touch panel is arranged for generating an electronic signal according a gesture applied on a touch panel, and for displaying an application container according to a control signal. The detecting unit is arranged for generating a detection result according to the electronic signal, wherein the detection result includes a first position of the gesture corresponding to the touch panel. The determining unit is arranged for starting the application container when the detection result indicates that the detected gesture is a multi-fingered grab gesture. The control unit is arranged for outputting the control signal to the touch panel according to the application container, in order to display the application container at the first position.

In summary, a touch-controlled device and a related method for detecting a gesture applied on a touch panel of the touch-controlled device to display an application container are provided in the present invention. By using a grab gesture, the application menu and the functional menu can be quickly launched in order to avoid complicated operating processes and improve the usage efficiency.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
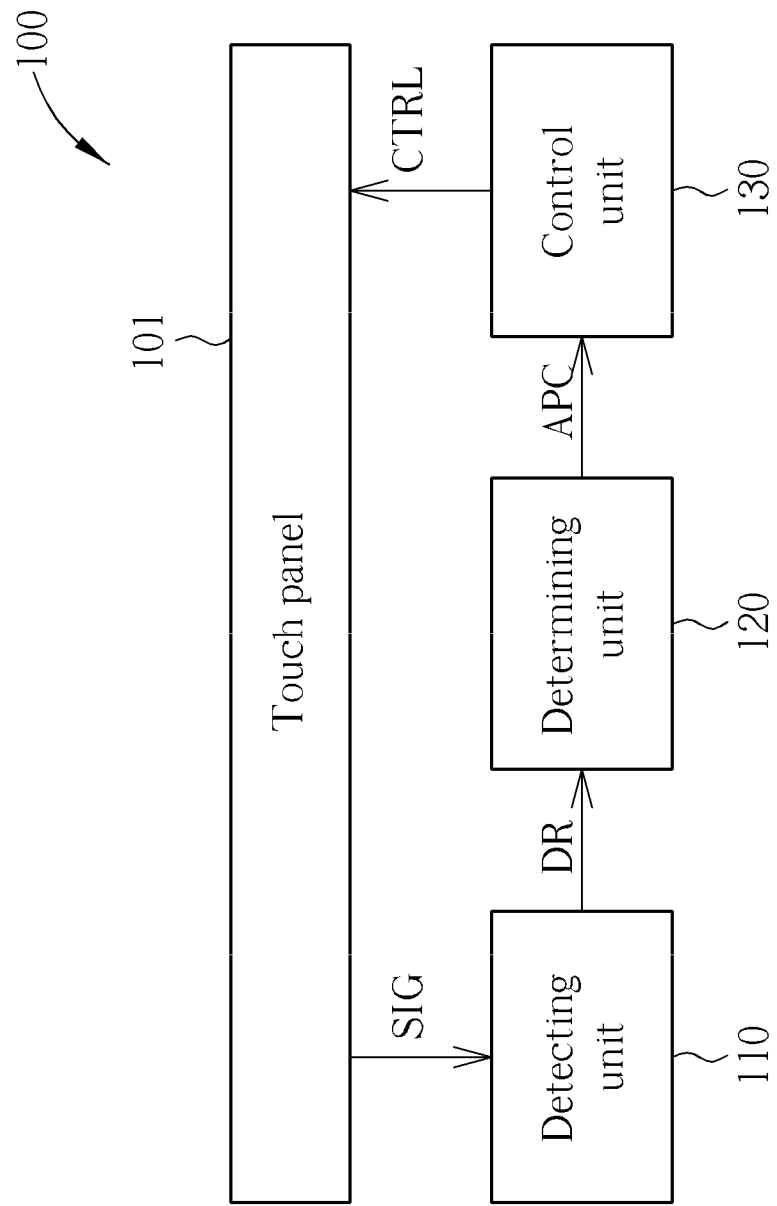
FIG. 1 is a diagram illustrating a touch-controlled device according to a first embodiment of the present invention.

Please refer to FIG. 1. FIG. 1 is a diagram illustrating a touch-controlled device 100 according to a first embodiment of the present invention. The touch-controlled device 100 may include, but is not limited to, a touch panel 101, a detecting unit 110, a determining unit 120, and a control unit 130. The touch panel 101 is an input device of the touch-controlled device 100, and is arranged for generating an electronic signal SIG according a gesture applied on the touch panel, and for displaying an application container APC according to a control signal CTRL. The detecting unit 110 is coupled to the touch panel 101, and is arranged for generating a detection result DR according to the electronic signal SIG, wherein the detection result DR includes information related to a first position P1 of the gesture corresponding to the touch panel 101. The determining unit 120 is coupled to the detecting unit 110, and is arranged for starting the application container APC when the detection result DR indicates that the detected gesture is a multi-fingered grab gesture. In addition, the control unit 130 is coupled to the determining unit 120 and the touch panel 101, and is arranged for outputting the control signal CTRL to the touch panel 101 according to the application container APC. After that, the touch panel 101 is further arranged for displaying the application container APC at the first position P1 according to the control signal CTRL. In this embodiment, the first position P1 can be a center point of the gesture, but the present invention is not limited to this only. In other embodiments, the first position P1 can be defined as any point near the gesture. In other words, the display position of the application container APC is not fixed, and can be changed as the position of the gesture changes. Moreover, the application container APC may include an application menu APP_LST and a functional menu AXN_LST. In this embodiment, the functional menu AXN_LST shows a roulette shape, and the application menu APP_LST shows a circular shape in the periphery of the functional menu AXN_LST. However, this should not be considered as a limitation of the present invention, and those skilled in the art should appreciate that various modifications of the shape of the application menu APP_LST and the functional menu AXN_LST may be made without departing from the spirit of the present invention. Besides, the touch-controlled device 100 may be a notebook PC or a tablet PC, and the touch panel 101 may be an implemented by a multi-touch touch panel, a capacitive touch panel, a resistive touch panel, or an optical touch panel, but the present invention is not limited to this only.

In more details, when the electronic signal SIG is detected by the detecting unit 110, the detecting unit 110 can determine the type of the gesture according to characteristics of the electronic signal SIG and translate its related information (such as, the start status, the process, the end status, and/or the position of the gesture) into the detection result DR. Herein the position of the gesture is corresponding to the first position P1, such that the determining unit 120 can start the application container APC when the detection result DR indicates that the detected gesture is a multi-fingered grab gesture. Then, the control unit 130 may output the control signal CTRL to the touch panel 101 according to the application container APC, in order to display the application container APC at the first position P1. What calls for special attention is that: the multi-fingered grab gesture is presented merely to illustrate practicable designs of the present invention, which implies that the detected gesture won't be implemented by a single-fingered gesture or a two-fingered gesture, and in no way should be considered to be limitations of the scope of the present invention.

Figure 2:
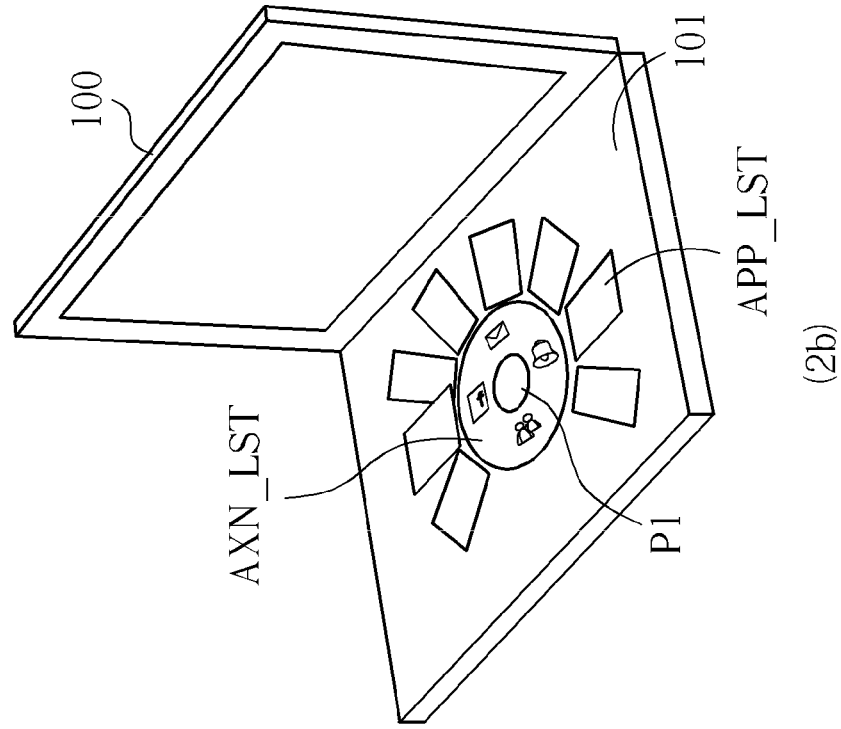
FIG. 2 (including sub-FIGS. 2a and 2b) is a diagram illustrating how to display an application container on a touch-controlled device according to a multi-fingered grab gesture according to an exemplary embodiment of the present invention.
Figure 2:
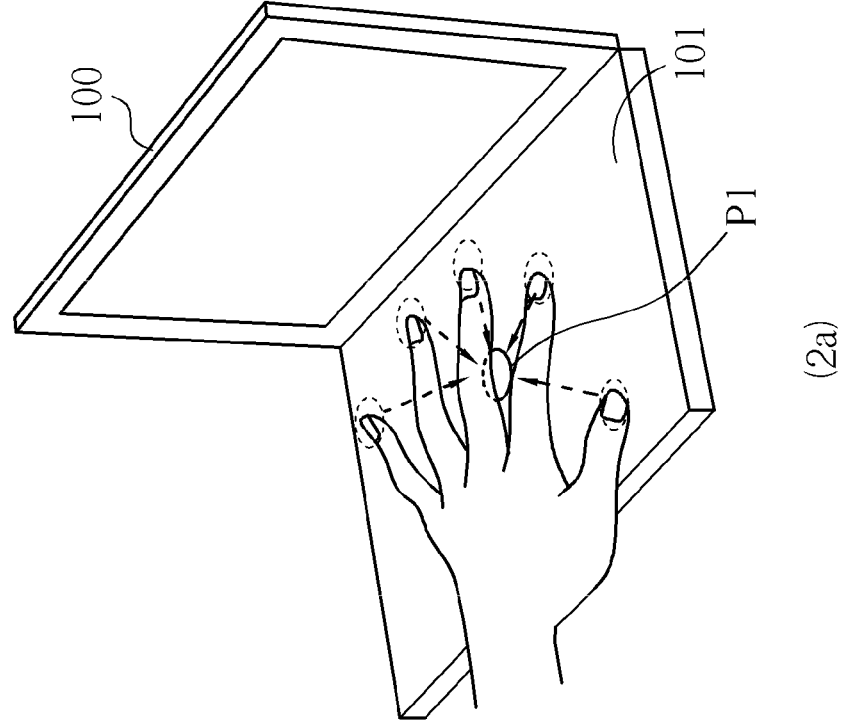

In the following descriptions, some exemplary embodiments are cited for illustrating how to display the application container APC. Please refer to FIG. 2. FIG. 2 is a diagram illustrating how to display an application container on a touch-controlled device according to a multi-fingered grab gesture according to an exemplary embodiment of the present invention. FIG. 2 has sub-FIGS. 2*a* and 2*b*, wherein the sub-FIG. 2*a* shows how to apply a multi-fingered grab gesture on the touch-controlled device 100 according to an exemplary embodiment of the present invention. As shown in the sub-FIG. 2*a*, when a user applies a multi-fingered grab gesture on the touch panel 101 of the touch-controlled device 100, the corresponding electronic signal SIG is generated by the touch panel 101. After that, the detecting unit 110 may generate the detection result DR according to the electronic signal SIG, wherein the detection result DR includes the first position P1 which is corresponding to the position of the multi-fingered grab gesture applied on the touch panel 101. Please keep referring to the sub-FIG. 2*b*. The sub-FIG. 2*b* shows how to display the application container APC on the touch panel 101 of the touch-controlled device 100. As shown in the sub-FIG. 2*b*, when the detection result DR indicates that the detected gesture is a multi-fingered grab gesture, the determining unit 120 may start the application container APC. After that, the control unit 130 may output the control signal CTRL to the touch panel 101 according to the application container APC, in order to display the application container APC at the first position P1.

Figure 3:
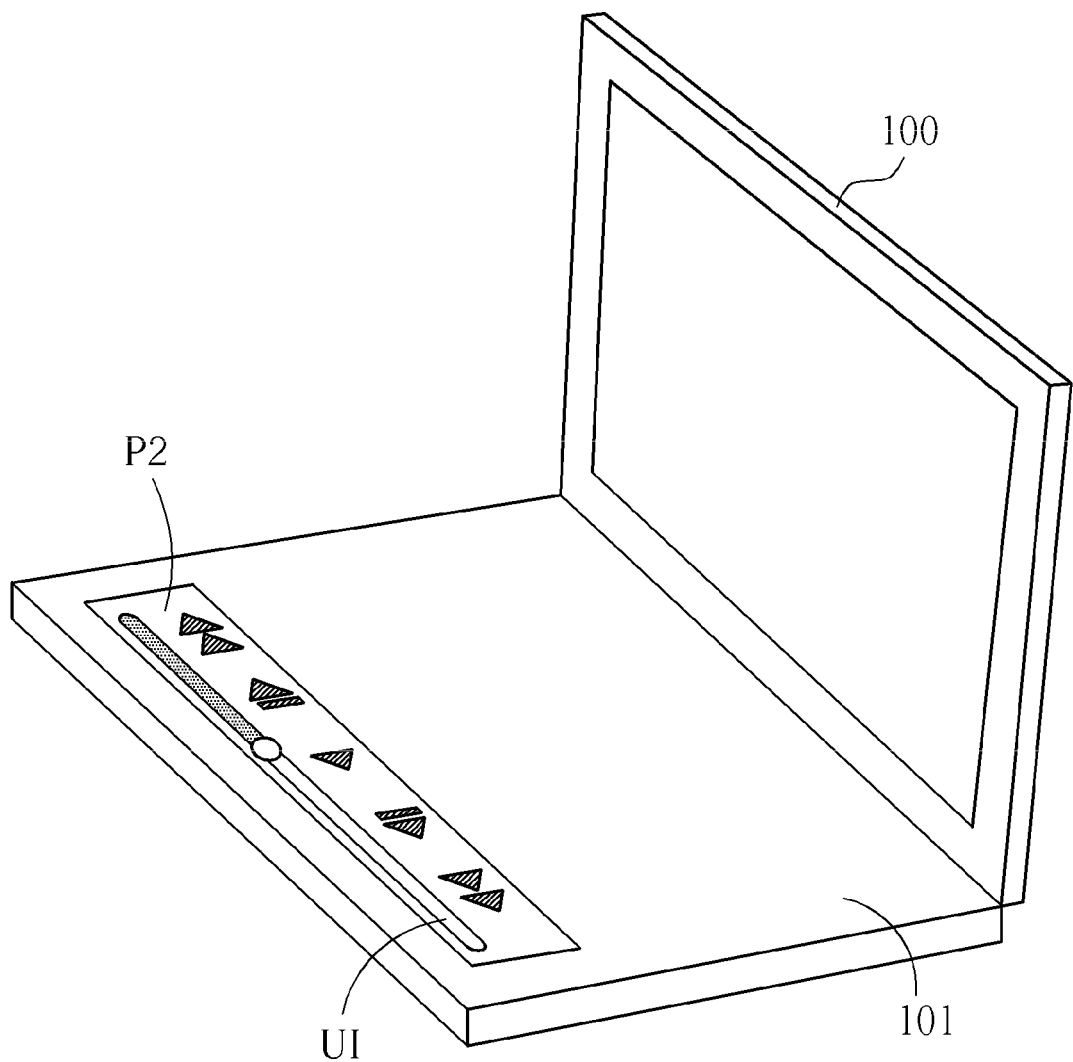
FIG. 3 is a diagram illustrating how to display an interactive user interface of the touch-controlled device according to an exemplary embodiment of the present invention.

Besides, after an application is started, the control unit 130 may be further used for displaying an interactive user interface UI corresponding to the application at a second position P2 of the touch panel, wherein the interactive user interface UI is used for controlling the application. Please refer to FIG. 3. FIG. 3 is a diagram illustrating how to display an interactive user interface UI of the touch-controlled device 100 according to an exemplary embodiment of the present invention. As shown in FIG. 3, the interactive user interface UI may be implemented by a control panel of a multimedia player for controlling the multimedia player. After the multimedia player (i.e., the application to be executed) is started by the control unit 130, the control panel of the multimedia player is display at the second position P2 of the touch panel 101 (i.e., the bottom of the touch panel 101). What calls for special attention is that: the second position P2 can be predefined in each application, those skilled in the art can easily understand features related to the second position P2, and further description is omitted here for brevity.

Figure 4:
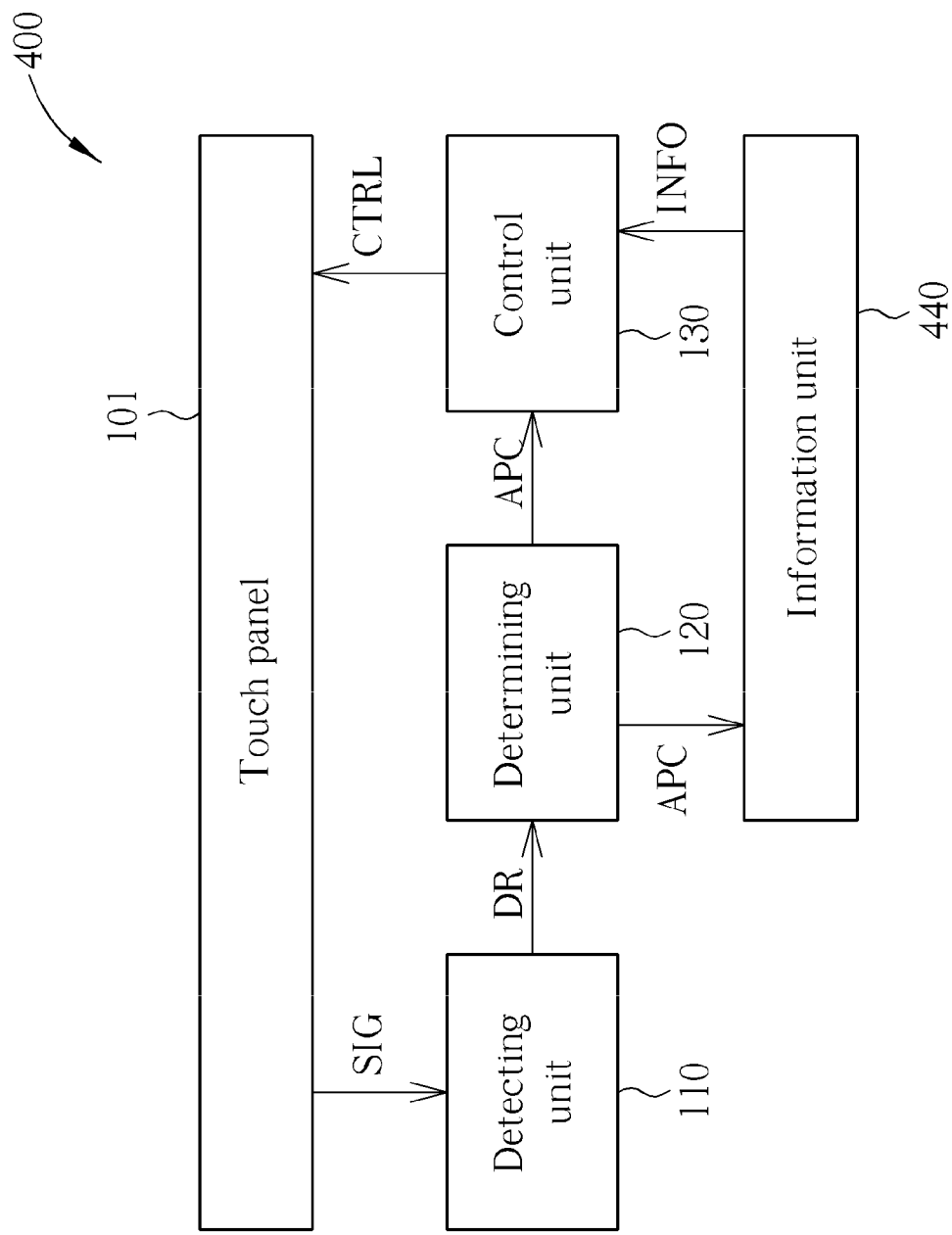
FIG. 4 is a diagram illustrating a touch-controlled device according to a second embodiment of the present invention.
Figure 5:
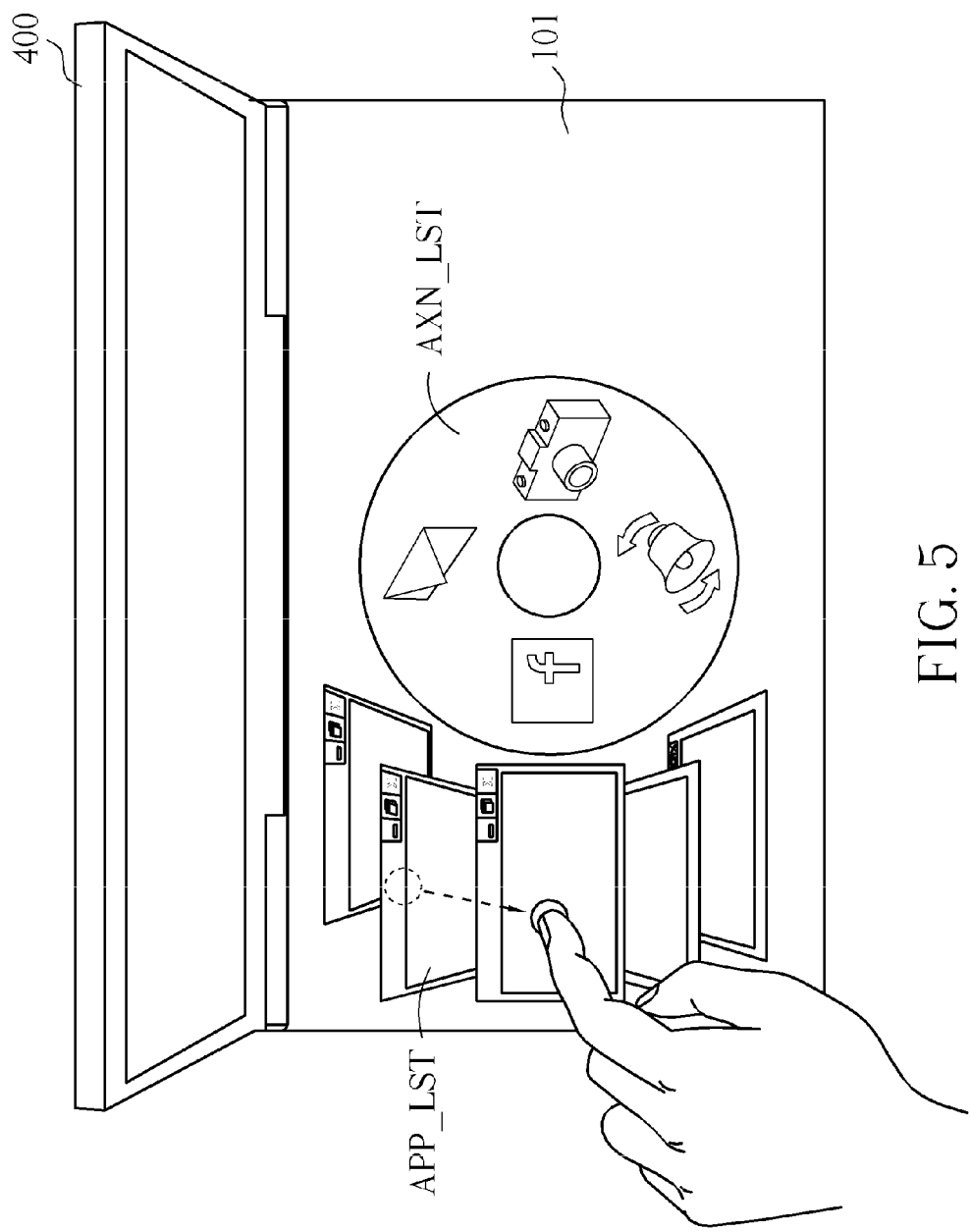
FIG. 5 is a diagram illustrating how to display an application container on the touch-controlled device according to an exemplary embodiment of the present invention.

Please refer to FIG. 4. FIG. 4 is a diagram illustrating a touch-controlled device 400 according to a second embodiment of the present invention. The architecture of the touch-controlled device 400 shown in FIG. 4 is similar to that of the touch-controlled device 100 shown in FIG. 1, and the difference between them is that: the touch-controlled device 400 shown in FIG. 4 further includes an information unit 440 coupled to the control unit 130 and the determining unit 120, for obtaining an application information INFO corresponding to at least one application of the application menu APP_LST, wherein the application information INFO at least comprises an application name NAME and an application snapshot position SNAPSHOT_PATH. Then, the control unit 130 may output the control signal CTRL to the touch panel 101 according to the application name NAME and the application snapshot position SNAPSHOT_PATH, in order to display a name and a snapshot of the at least one application at the first position P1. Since the application NAME may need to support several languages, a dynamic-link library (DLL) file can be used for storing the program name NAME with multiple languages in the present invention. Please keep referring to FIG. 5. FIG. 5 is a diagram illustrating how to display an application container APC on the touch-controlled device 400 according to an exemplary embodiment of the present invention. As shown in FIG. 5, the functional menu AXN_LST shows a roulette shape in the middle location of the touch panel 101, and the application menu APP_LST shows a circular shape and displays the snapshots of the applications in the periphery of the functional menu AXN_LST. Furthermore, an application to be executed in the application menu APP_LST can be selected according to a single-fingered drag gesture. When the block of the application menu APP_LST displayed on the touch panel 101 is touched and dragged by a single finger of the user, the snapshot corresponding to the selected application will be highlighted in order to make things convenient for the user upon distinguishing the selected application.

In addition, the application information INFO may further include a window name TITLE, an executable file name EXE, an application installation path INST_PATH, and parameters AGU for executing an application. The window name TITLE can be used for message handling between the application container APC and the application. For example, the application container APC may utilize the window name TITLE to transmit an update snapshot information UD_SNAPSHOT_MSG to the application of the application container APC for asking the application corresponding to the window name TITLE to update its snapshot. Or the application container APC may utilize a kill application information KILL_MSG for asking the application corresponding to the window name TITLE to automatically close the application. On the other hand, the executable file name EXE, the application installation path INST_PATH, and parameters AGU for executing the application can be used for generating an execution command CMD for executing the application. What calls for special attention is that: using the window name for message handling and generating execution command are already well-known to those skilled in the art, and further description is omitted here for brevity.

Figure 6:
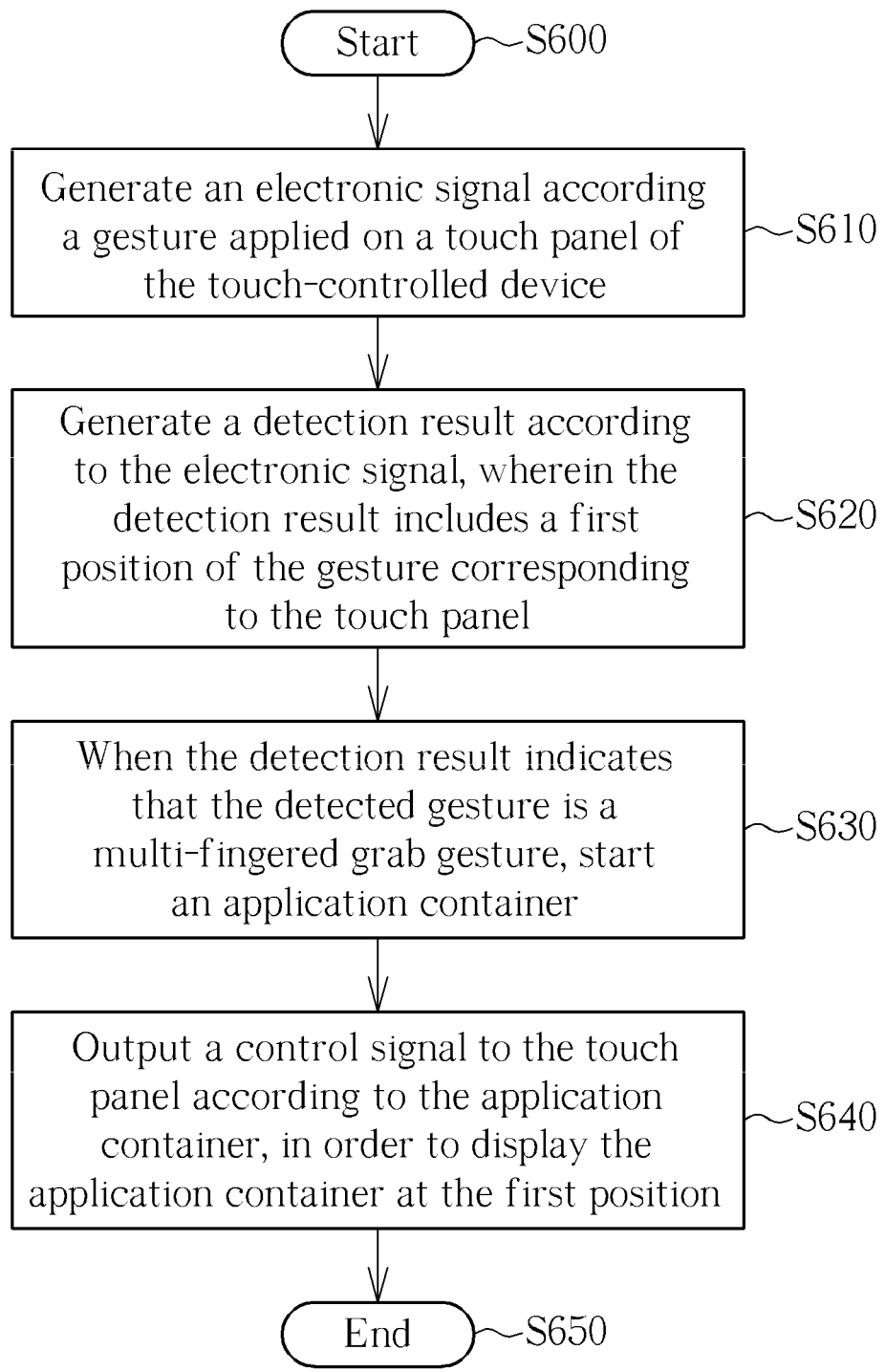
FIG. 6 is a flowchart illustrating a method for displaying applications of a touch-controlled device according to an exemplary embodiment of the present invention.

Please refer to FIG. 6. FIG. 6 is a flowchart illustrating a method for displaying applications of the touch-controlled device 100 shown in FIG. 1 according to an exemplary embodiment of the present invention. Please note that the following steps are not limited to be performed according to the exact sequence shown in FIG. 6 if a roughly identical result can be obtained. The method may include, but is not limited to, the following steps:

Step S600: Start.

Step S610: Generate an electronic signal SIG according a gesture applied on a touch panel 101 of the touch-controlled device 100.

Step S620: Generate a detection result DR according to the electronic signal SIG, wherein the detection result DR includes a first position P1 of the gesture corresponding to the touch panel 101.

Step S630: When the detection result DR indicates that the detected gesture is a multi-fingered grab gesture, start an application container APC.

Step S640: Output a control signal CTRL to the touch panel 101 according to the application container APC, in order to display the application container APC at the first position P1.

Step S650: End.

Those skilled in the art can readily understand the details and variations how each element operates by combining the steps shown in FIG. 6 and the elements of the touch-controlled device 100 shown in FIG. 1 stated above, and further description is omitted here for brevity.

Figure 7:
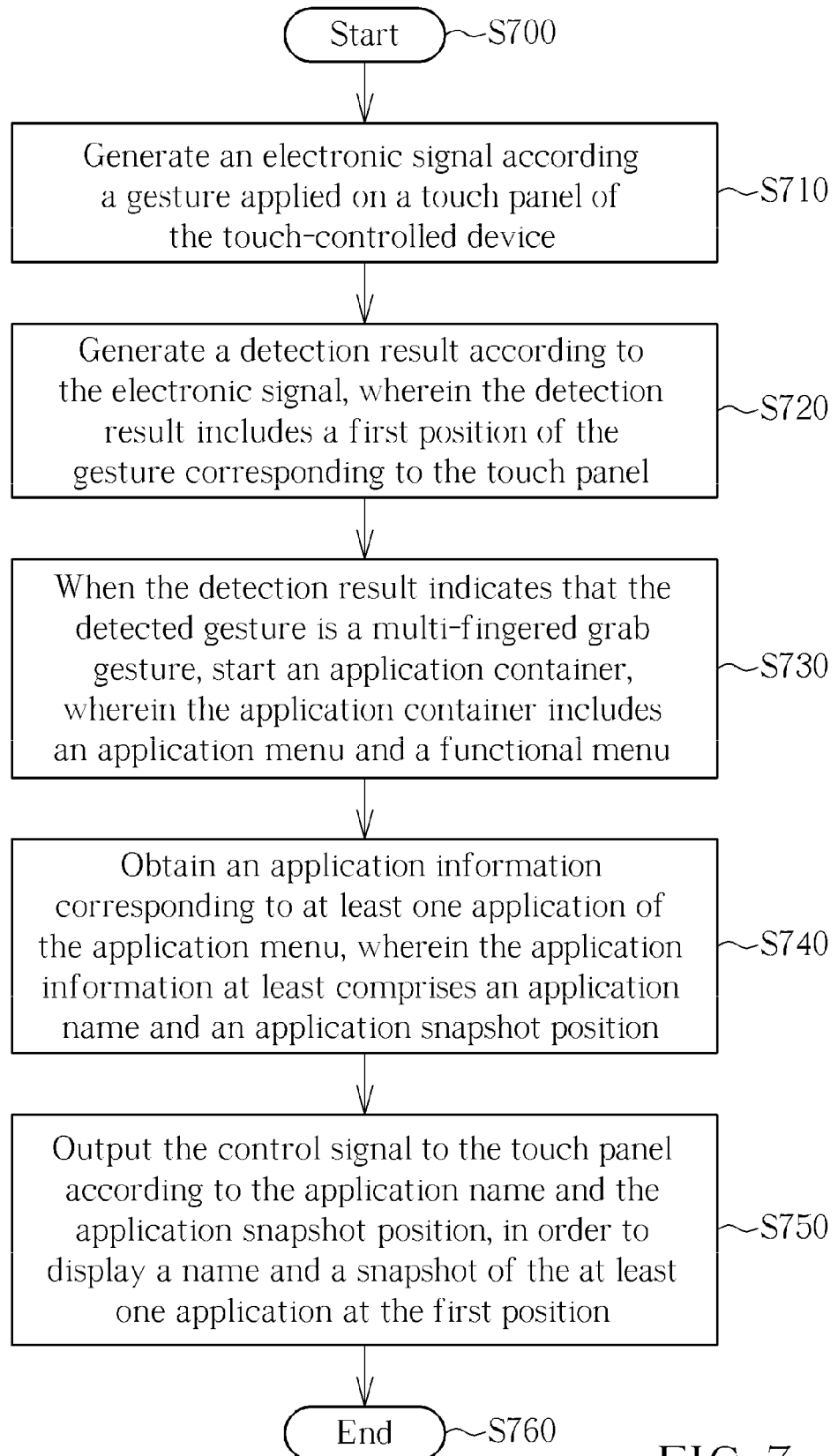
FIG. 7 is a flowchart illustrating a method for displaying applications of a touch-controlled device according to another exemplary embodiment of the present invention.

Please refer to FIG. 7. FIG. 7 is a flowchart illustrating a method for displaying applications of a touch-controlled device 400 shown in FIG. 4 according to another exemplary embodiment of the present invention. Please note that the following steps are not limited to be performed according to the exact sequence shown in FIG. 7 if a roughly identical result can be obtained. The method may include, but is not limited to, the following steps:

Step S700: Start.

Step S710: Generate an electronic signal SIG according a gesture applied on a touch panel 101 of the touch-controlled device 400.

Step S720: Generate a detection result DR according to the electronic signal SIG, wherein the detection result DR includes a first position P1 of the gesture corresponding to the touch panel 101.

Step S730: When the detection result DR indicates that the detected gesture is a multi-fingered grab gesture, start an application container APC, wherein the application container APC includes an application menu APP_LST and a functional menu AXN_LST.

Step S740: Obtain an application information INFO corresponding to at least one application of the application menu, wherein the application information INFO at least comprises an application name NAME and an application snapshot position SNAPSHOT_PATH.

Step S750: Output the control signal CTRL to the touch panel 101 according to the application name NAME and the application snapshot position SNAPSHOT_PATH, in order to display a name and a snapshot of the at least one application at the first position P1.

Step S760: End.

Those skilled in the art can readily understand the details and variations how each element operates by combining the steps shown in FIG. 7 and the elements of the touch-controlled device 400 shown in FIG. 4 stated above, and further description is omitted here for brevity.

Please note that, the steps of the abovementioned flowcharts are merely practicable embodiments of the present invention, and in no way should be considered to be limitations of the scope of the present invention. These methods can include other intermediate steps or several steps can be merged into a single step without departing from the spirit of the present invention.

What calls for special attention is that: the application menu APP_LST is extensible. That is, when the application container APC is started, newly-added application can be checked according to the rules of the specification, and items (such as, icons) of the newly-added applications will be displayed when displaying the application menu APP_LST. Furthermore, the snapshots of the applications can adopt different updating manners according to the characteristics of each program. For example, regarding a text processing program, its snapshot can be updated when the program is closed. On the other hand, regarding an internet browsing program, its snapshot can be updated real time. Therefore, the user experiences can be improved by updating the snapshot of the programs.

The abovementioned embodiments are presented merely to illustrate practicable designs of the present invention, and should be considered to be limitations of the scope of the present invention. In summary, a touch-controlled device and a related method for detecting a gesture applied on a touch panel of the touch-controlled device to display an application container are provided. By using a grab gesture, the application menu and the functional menu can be quickly launched in order to avoid complicated operating processes and improve the usage efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying applications of a touch-controlled device, comprising:

generating an electronic signal according a gesture applied on a touch panel of the touch-controlled device;

generating a detection result according to the electronic signal, wherein the detection result includes a first position of the gesture corresponding to the touch panel;

when the detection result indicates that the detected gesture is a multi-fingered grab gesture, starting an application container; and outputting a control signal to the touch panel according to the application container, in order to display the application container at the first position;

wherein the application container comprises an application menu, the application menu is updated in response to starting the application container, and a display portion of an updated application container is changed as the first position of the gesture changes.

2. The method according to claim 1, wherein the application container further comprises a functional menu.

3. The method according to claim 2, wherein the step of outputting the control signal to the touch panel according to the application container, in order to display the application container at the first position comprises:

obtaining an application information corresponding to at least one application of the application menu, wherein the application information at least comprises an application name and an application snapshot position; and outputting the control signal to the touch panel according to the application name and the application snapshot position, in order to display a name and a snapshot of the at least one application at the first position.

4. The method according to claim 3, wherein the application information further comprises a window name for message handling between the application container and the at least one application.

5. The method according to claim 2, wherein the functional menu shows a roulette shape, and the application menu shows a circular shape in the periphery of the functional menu.

6. The method according to claim 5, further comprising selecting an application to be executed in the application menu according to a single-fingered drag gesture.

7. The method according to claim 1, further comprising:

after an application is started, displaying an interactive user interface corresponding to the application at a second position of the touch panel, wherein the interactive user interface is used for controlling the application.

8. A touch-controlled device, comprising:

a touch panel, arranged for generating an electronic signal according a gesture applied on the touch panel, and for displaying an application container according to a control signal;

a detecting unit, coupled to the touch panel, for generating a detection result according to the electronic signal, wherein the detection result includes a first position of the gesture corresponding to the touch panel;

a determining unit, coupled to the detecting unit, for starting the application container when the detection result indicates that the detected gesture is a multi-fingered grab gesture; and a control unit, coupled to the determining unit and the touch panel, for outputting the control signal to the touch panel according to the application container, in order to display the application container at the first position;

wherein the application container comprises an application menu, the application menu is updated in response to starting the application container, and a display portion of an updated application container is changed as the first position of the gesture changes.

9. The touch-controlled device according to claim 8, wherein the application container further comprises a functional menu.

10. The touch-controlled device according to claim 9, further comprising:

an information unit, coupled to the control unit and the determining unit, for obtaining an application information corresponding to at least one application of the application menu, wherein the application information at least comprises an application name and an application snapshot position;

wherein the control unit is further arranged for outputting the control signal to the touch panel according to the application name and the application snapshot position, in order to display a name and a snapshot of the at least one application at the first position.

11. The touch-controlled device according to claim 10, wherein the application information further comprises a window name for message handling between the application container and the at least one application.

12. The touch-controlled device according to claim 9, wherein the functional menu shows a roulette shape, and the application menu shows a circular shape in the periphery of the functional menu.

13. The touch-controlled device according to claim 8, wherein the control unit is further arranged for displaying an interactive user interface corresponding to an application at a second position of the touch panel after the application is started, wherein the interactive user interface is used for controlling the application.

* * * * *